Oct. 10, 1939.  K. FRÖHLICH  2,175,562
SPRINGING ARRANGEMENT
Filed Dec. 26, 1934
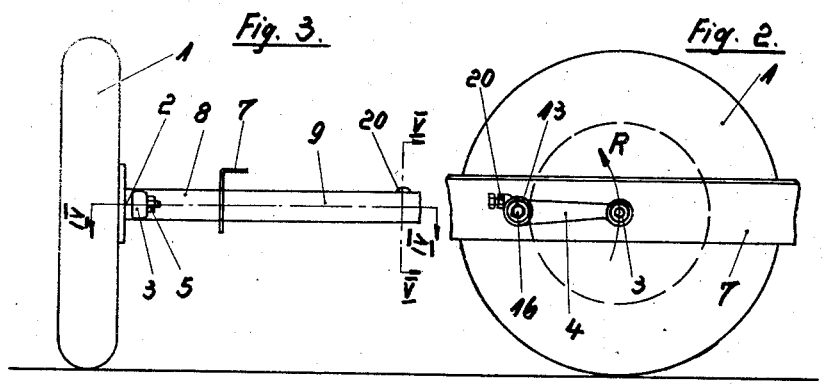
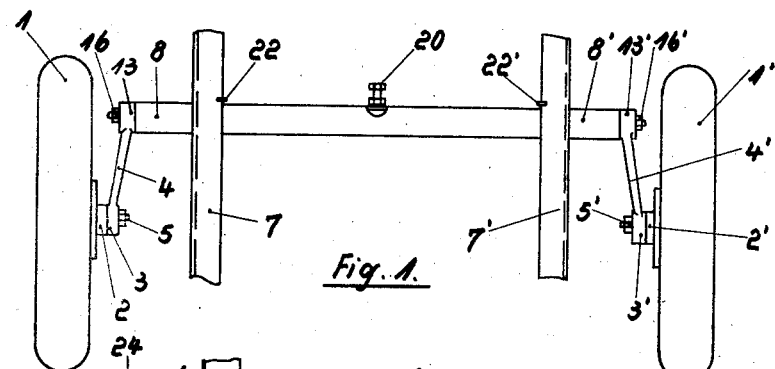
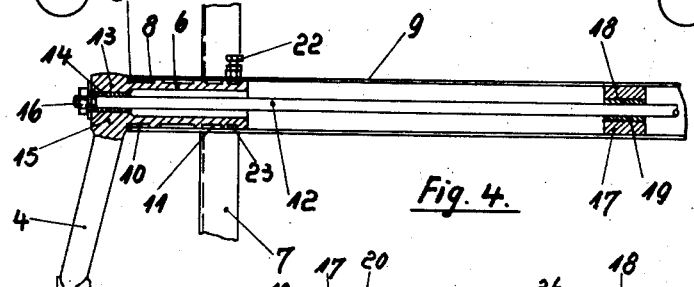
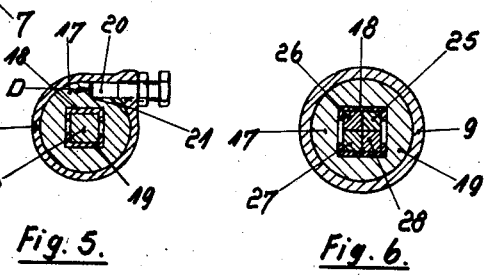
Inventor:

Patented Oct. 10, 1939

2,175,562

UNITED STATES PATENT OFFICE 2,175,562

SPRINGING ARRANGEMENT

Karl Fröhlich, Stuttgart, Germany, assignor to Dr. Ing. h. c. F. Porsche G. m. b. H., Stuttgart, Germany Application December 26, 1934, Serial No. 759,255
In Germany January 2, 1934

7 Claims. (Cl. 267—57)

This invention relates to springing arrangements for vehicles.

It is an object of the invention to provide an improved springing arrangement more particularly for road wheels supported by arms swingably mounted in the plane of travel, which arms are preferably acted upon by torsion spring bars extending transversely of the vehicle.

Another object of the invention is to provide such a construction in which torsion spring bars serve not only as spring members but also as supporting means for wheel carrying or supporting arms.

A further object is to provide such a device in which the torsion bars are housed in transverse tubular members which serve to provide an abutment for the torsion bars and preferably also to provide a journal for the wheel carrying arms.

Further objects are to provide an improved abutment means for such torsion bars, and to generally improve devices of this general type.

Two illustrative embodiments of the invention are shown in the accompanying drawing, wherein:

Fig. 1 shows a plan view of a portion of a vehicle such as a trailer or the trailer rear axle of a self propelled vehicle such as those having front wheel drive;

Fig. 2 is a side view of Fig. 1 the nearest wheel being omitted;

Fig. 3 is a rear view of part of the mechanism shown in Fig. 1;

Fig. 4 is a sectional view taken on the line IV—IV of Fig. 3;

Fig. 5 is a section taken on line V—V of Fig. 3; and

Fig. 6 is a view similar to Fig. 5 of a modified form of abutment means.

The wheel 1 is mounted on the stub axle carrier 2 which is rigidly connected by any suitable means as a nut 5 with the end 3 of the link member 4, which swings in the direction of travel. The journal 6 of the link member 4 is rotatably mounted in the end 8 projecting beyond the longitudinal frame member 7 of a transverse frame tube 9 as by means of rings 10, 11 inserted in peripheral grooves. The journal 6 is shown as hollow and as in engagement with a co-axial four-sided spring bar 12 by means of jaws 14, 15, which are suitably held fast as by means of a nut 16, in the hub 13 of the link member. The spring bar 12 extends over the breadth of the frame and is connected with the opposite link journal in exactly the same manner. The spring bar 12 is shown mounted in the middle in an abutment 17 by means of jaws 18, 19. The abutment 17 is rotatable in the transverse frame tube 9 and can be fixed by means of a screw 20 as shown. The screw 20 engages in a recess 21 of the abutment 17, which allows for adjustment and preferably also secures the abutment against axial displacement. The inner end of the journal 6 is shown provided with a groove 23 in which a securing screw 22 mounted in the frame tube 9 engages with a certain amount of play in order to take care of the longitudinal shortening of the torsion bar which results when the same is twisted. The hub 13 is preferably guided on the end 8 of the frame tube by means of a disc 24. The frame tube 9 passes through the web of the longitudinal frame member 7 and is firmly secured thereto as by welding.

If the wheel 1 swings in the direction R the outer end of the bar 12 is turned by the jaws 14, 15 with respect to the jaws 18, 19 so that the bar 12 is deformed over half of its length. The pressure D of the abutment 17 is transmitted through the screw 20 to the transverse frame tube 9, which is so mounted that it is unable to twist. The link journal 6 is secured axially in this transverse tube by the spring bar 12 itself. If the spring bar 12 requires to be removed the nuts 16, 16' are removed and the spring bar is then drawn out from the bearings 14, 15 and 18, 19. The bearings 14, 15 and 18, 19, which are of similar construction, are interchangeable and allow of bars of different thicknesses being inserted. If the spring bar 12 has to be adjusted or re-adjusted the abutment 17 is rotated by means of the screw 20 in the transverse tube 9 and the desired and essential tension of the spring is obtained. This adjustment of the abutment 17 can also be effected under load. The screws 22, 22' will secure the link journal 6 in case the spring should break. In order to remove the link members 4, in addition to the nut 16 the screw 22 is removed and then the link journal 6 is withdrawn from the end 8 of the tube.

In case the desired results cannot be obtained with a single spring bar 12, either in view of the desired specific springing or the maximum stresses of the spring material, it is possible to use a group of spring bars. Fig. 6 shows how four similar spring bars 25–28 can be combined in such a manner that they can be mounted in the jaws 18, 19 like a single spring bar. In this case a pressure screw may be dispensed with if the spring abutment 17 is rigidly connected with the transverse tube 9.

The invention is not restricted to the constructional examples. Individual features of the invention can also be employed for link members swinging across the direction of travel. The cross-section of the spring bar, or group of bars, may be chosen as desired as long as it can be secured by means of jaws. Thus, for example a round bar may be made square at the ends and in the middle. The transverse tube 9 can also be secured to the longitudinal frame members 7, 7' in such a manner that the axle can be removed and interchanged as a unit.

The word "frame" as herein used is not to be understood as limited to such devices when formed separate from the body or coachwork of the vehicle but as including such devices when forming a part of or intimately interconnected with said body or coachwork of the vehicle.

While, for the sake of clearness, only certain expressions of the inventive idea have been illustrated and described in detail, it is to be understood that the invention is not limited thereto, but that the inventive idea is susceptible of various mechanical expressions within the limits of the appended claims, and that certain features thereof may be used alone or in combination with other known or suitable devices.

What I claim is:

1. In a vehicle, a frame, a transverse tube attached to said frame, torsion bar means within said tube, means carried by the tube for holding said torsion means against rotation, a road wheel, an axle therefor, and an arm attached to and carrying said axle, said arm being journaled relative to said tube and being provided with means for engaging one end of said torsion bar, said engaging means being so constructed and formed that said bar holds the wheel carrying arm against substantial transverse movement, and coacting means on said arm and said tube to hold said arm against transverse movement in case of breakage of said torsion bar, while permitting variations in the length of said bar due to the twisting thereof.

2. In a vehicle, a frame, a transverse tube attached to said frame, torsion bar means within said tube, an arm journaled within said tube and being provided with means for engaging said torsion bar, means within said tube and engaging said torsion bar near its center, and means for adjustably positioning said torsion bar engaging means relative to said tube.

3. In a vehicle, a frame, a transverse tube attached to said frame, torsion bar means within said tube, means carried by the tube for holding said torsion means against rotation, a road wheel, an axle therefor, and a grooved arm attached to and carrying said axle, said arm being journaled relative to said tube and being provided with means for engaging one end of said torsion bar, and means on said tube co-acting with a groove on said arm to hold said arm against substantial transverse movement while allowing free rotation of said arm, and permitting sufficient transverse movement to compensate for variations in length of said torsion bar due to the twisting thereof.

4. In a vehicle, a frame including a tube, spring means within said tube, an arm journaled within said tube and being provided with means for engaging said spring means, means within said tube and engaging said spring means near its center, and means for adjustably positioning the engaging means relative to said tube.

5. In a vehicle, a frame, a tube attached to said frame, spring means within said tube, means integral therewith near its center and having a cut-out portion, an arm journaled within said tube and being provided with means for engaging said spring means, and means for engaging said cut-out portion of said integral means and adjustably positioning said spring means relative to said tube.

6. The combination according to claim 4 in which said spring means is a torsion bar.

7. The combination according to claim 5 in which said spring means is a torsion bar.

KARL FRÖHLICH.